United States Patent
Iwakura et al.

(10) Patent No.: US 10,852,750 B2
(45) Date of Patent: Dec. 1, 2020

(54) MEASUREMENT APPARATUS, MEASUREMENT INSTRUCTION APPARATUS, MEASUREMENT SYSTEM, AND NON-TRANSITORY COMPUTER-READABLE RECORDING MEDIUM

(71) Applicant: Mitsubishi Electric Corporation, Chiyoda-ku (JP)

(72) Inventors: Takashi Iwakura, Chiyoda-ku (JP); Takayuki Ishida, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 135 days.

(21) Appl. No.: 16/199,350

(22) Filed: Nov. 26, 2018

(65) Prior Publication Data
US 2019/0171237 A1 Jun. 6, 2019

(30) Foreign Application Priority Data
Dec. 1, 2017 (JP) .................................. 2017-231679

(51) Int. Cl.
*G05D 1/10* (2006.01)
*G01C 11/02* (2006.01)
*G01C 11/04* (2006.01)

(52) U.S. Cl.
CPC ............. *G05D 1/101* (2013.01); *G01C 11/02* (2013.01); *G01C 11/04* (2013.01)

(58) Field of Classification Search
CPC ...... G05D 1/101; G05D 1/0094; G01C 11/02; G01C 11/04; G01M 5/005; G01M 5/0091
USPC ............................................................ 701/3
See application file for complete search history.

(56) References Cited

U.S. PATENT DOCUMENTS

2012/0173053 A1* 7/2012 Ohtomo ................. G01C 11/04
701/4
2019/0094149 A1* 3/2019 Troy .................... G01M 5/0075

FOREIGN PATENT DOCUMENTS

JP 2012-140101 7/2012
WO WO-2017-073310 * 5/2017

* cited by examiner

*Primary Examiner* — Muhammad Shafi
(74) *Attorney, Agent, or Firm* — Oblon, McClelland, Maier & Neustadt, L.L.P.

(57) ABSTRACT

A measurement apparatus is to be mounted on a flying craft that flies in vicinity of the architectural structure and the measurement apparatus controls the flying craft to move to a measurement position indicated as a relative position with respect to a position of the flying craft and measures the architectural structure.

5 Claims, 11 Drawing Sheets

MEASUREMENT APPARATUS, MEASUREMENT INSTRUCTION APPARATUS, MEASUREMENT SYSTEM, AND NON-TRANSITORY COMPUTER-READABLE RECORDING MEDIUM

CROSS-REFERENCE TO RELATED APPLICATION

This application claims the benefit of Japanese Patent Application No. 2017-231679, filed on Dec. 1, 2017 the entire disclosure of which is incorporated by reference herein.

FIELD

The present disclosure relates to a measurement apparatus, a measurement instruction apparatus, a measurement system, and a non-transitory computer-readable recording medium.

BACKGROUND

Large architectural structures such as an antenna or telescope are subjected to strain during use due to thermal expansion or contraction or due to bending caused by weight of the architectural structures. Yet, to meet performance demands, it is necessary to manage shapes of these architectural structures and to ensure that the shapes remain within a reference range. Therefore, the shapes of these architectural structures must be frequently measured to understand what kind of strain to which these architectural structures are subjected.

Technology for mounting a measurement apparatus such as a photogrammetry apparatus on a flying craft such as a remotely-operated drone, moving the flying craft in vicinity of an architectural structure to measure the architectural structure from multiple locations, and calculating a shape of the architectural structure based on the measurement result is one example of existing technology for measuring strain on a large architectural structure.

Unexamined Japanese Patent Application Kokai Publication No. 2012-140101 describes a technique in which a measurement apparatus uses photogrammetry to measure a shape of an architectural structure. In photogrammetry, the measurement apparatus takes images of the architectural structure as the flying craft moves to multiple image-taking locations in vicinity of the architectural structure and measures the shape of the architectural structure. In order to accurately measure shape of the architectural structure with use of photogrammetry, it is necessary to use a navigation apparatus to ascertain the position of the flying craft and to control the position of the flying craft such that a predetermined distance is maintained between the architectural structure and the measurement apparatus.

SUMMARY

In the technology described in Cited Reference 1, a satellite positioning system such as a Global Positioning System (GPS) is used in order to ascertain a position of a flying craft. However, even if the position of the flying craft is acquired by the satellite positioning system, it is difficult to accurately adjust a distance between the architectural structure and the flying craft in a case in which the position of the architectural structure cannot be acquired by the satellite positioning system or in a case in which an orientation of the architectural structure changes. Also, in a case in which the flying craft moves in vicinity of the large architectural structure, a dome protecting the architectural structure or the architectural structure itself may block electromagnetic waves from a satellite thereby decreasing the accuracy of the acquired position.

The present disclosure can provide the measurement apparatus, the measurement instruction apparatus, the measurement system, and the non-transitory computer-readable recording medium that are capable of measuring an architectural structure, even when the position information from the satellite positioning system cannot be acquired, by observing the position of the architectural structure and the position of the measurement apparatus.

BRIEF DESCRIPTION OF THE DRAWINGS

A more complete understanding of this application can be obtained when the following detailed description is considered in conjunction with the following drawings, in which.

DETAILED DESCRIPTION

A measurement system 1 according to an embodiment of the present disclosure is described with reference to FIGS. 1 to 11. Throughout the drawings, components that are the same or equivalent are assigned the same reference signs.

Figure 1:
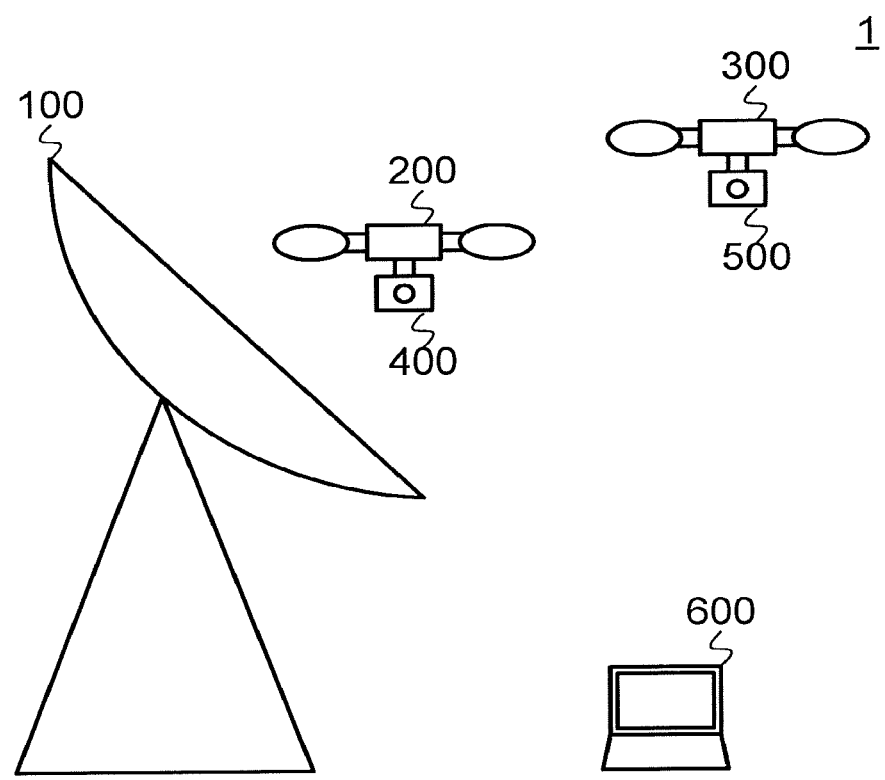
FIG. 1 is a side view of a measurement system and an architectural structure subject to measurement.

FIG. 1 is a side view illustrating the measurement system 1 according to Embodiment 1 of the present disclosure and an architectural structure 100 subject to measurement. As illustrated in FIG. 1, the measurement system 1 includes a flying craft 200 that flies in vicinity of the architectural structure 100 subject to measurement, a stationary flying craft 300, a measurement apparatus 400 that is mounted on the flying craft 200, a measurement instruction apparatus 500 that is mounted on the flying craft 300, and a remote control apparatus 600 for inputting data and instructions. The measurement system 1 uses an image taken of the architectural structure 100 by the measurement device 400 and measures a shape of the architectural structure 100.

Figure 2:
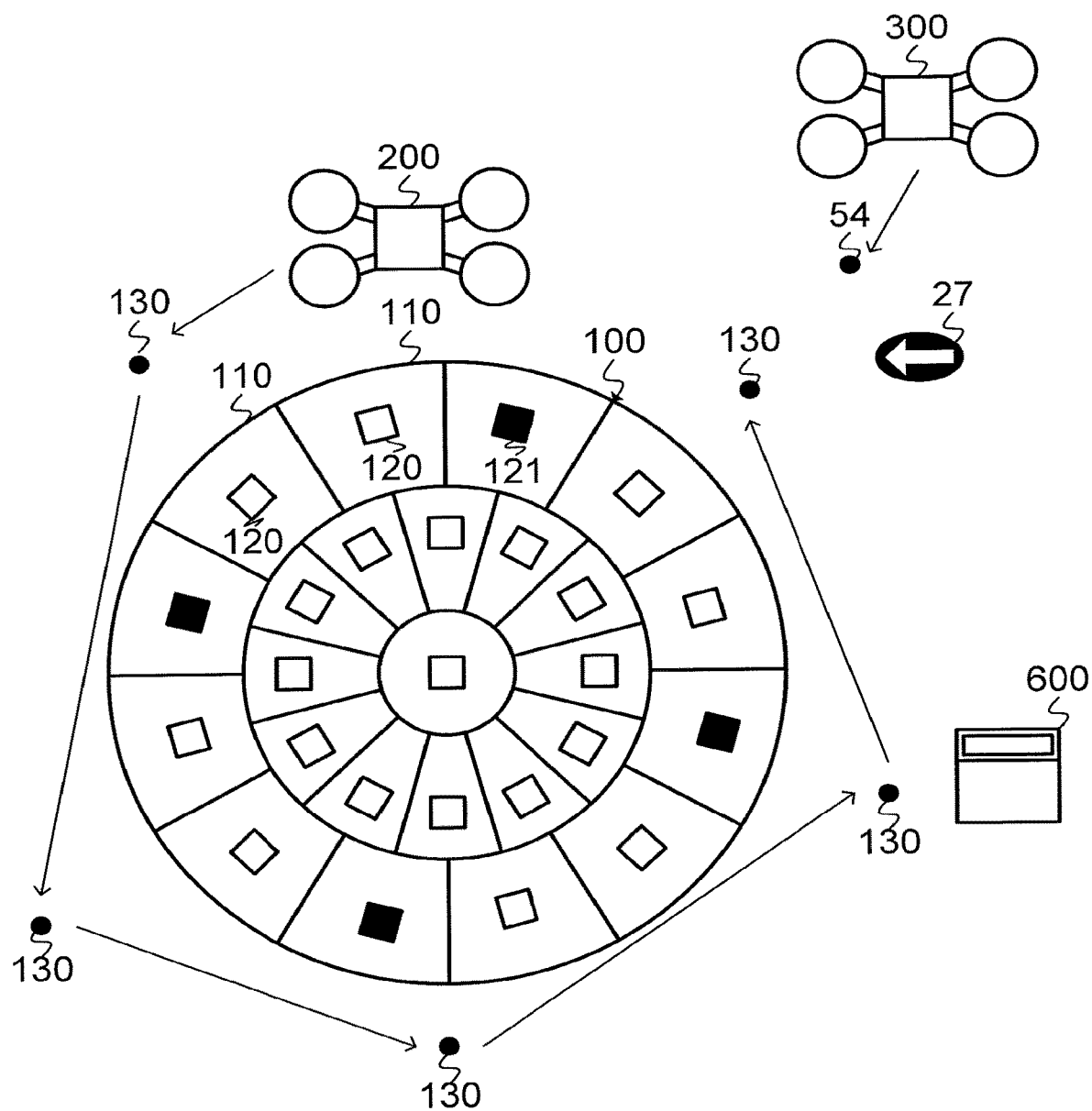
FIG. 2 is a top view of the measurement system and the architectural structure subject to measurement.

FIG. 2 is a top view of the measurement system 1 according to Embodiment 1 and the architectural structure 100 subject to measurement. As illustrated in FIG. 2, the architectural structure 100 includes a plurality of members 110. The members 110 are members that form the architectural structure 100 and in the example illustrated in FIG. 2, the members 110 are reflective panels that form a reflector. Examples of the architectural structure 100 include an antenna and a reflecting telescope but the architectural structure 100 is not limited to these examples.

Each of the members 110 of the architectural structure 100 has at least one marker 120. The marker 120 is displayed on a face of the member 110 so as to be recognizable from the measurement apparatus 400. The marker 120 is a reference position with respect to the architectural structure 100 for when the measurement system 1 measures the shape of the architectural structure 100. Each of the markers 120 has an identification code that is different from the other identification codes and each of the markers 120 is distinguished by the identification code. In other words, the markers 120 are located in multiple locations and each marker 120 has an identification code that is different from the other identification codes.

As illustrated in FIG. 2, the flying craft 200 in which the measurement apparatus 400 is mounted, moves in accordance with an instruction of the measurement instruction apparatus 500 moves through the air in vicinity of the architectural structure 100 by way of at least one measurement position 130 along a flight scenario 531. Also, the stationary flying craft 300 in which the measurement instruction apparatus 500 is mounted hovers in the air in vicinity of the architectural structure 100 at stationary position 54 where both the architectural structure 100 and the flying craft 200 observable. The measurement instruction apparatus 500 controls the stationary flying craft 300 such that the stationary flying craft 300 is stationary at the stationary position 54 based on the architectural structure 100 and a reference point 27 set as a position observable from the stationary position 54.

At least two measurement positions 130 are asset with respect to the architectural structure 100 to cover the entire area that of the architectural structure 100 subject to measurement. Using the marker 120 disposed on the architectural structure 100, the position of the measurement position 130 is defined as a relative position from the position of the marker 120. The marker 120 that serves as a reference of the position of the measurement position 130 is referred to as a designation marker 121. In the flight scenario 531, the at least one measurement position 130 for measuring the shape of the architectural structure 100 is designated by the designation position 121 corresponding to each measurement position 130 and the position based on the designation marker 121.

Figure 3A:
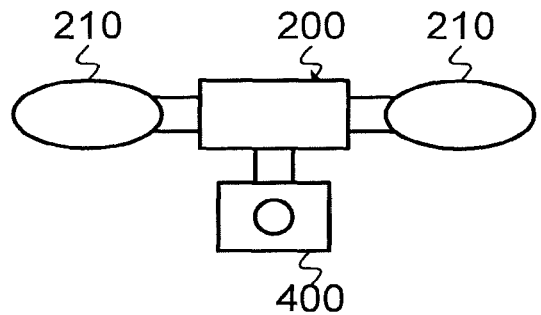
FIG. 3A is a side view of a flying craft.
Figure 3B:
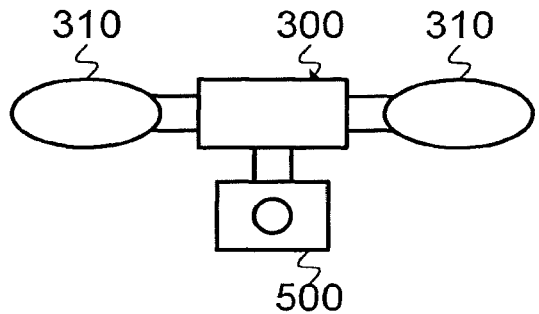
FIG. 3B is a side view of a stationary flying craft.

Components of the measurement system 1 are described with reference to the drawings. FIG. 3A is a side view of the flying craft 200. FIG. 3B is a side view of the stationary flying craft 300. As illustrated in FIG. 3A, the flying craft 200 is equipped with a plurality of rotors 210 that rotate thereby generating lift and propulsion. The measurement apparatus 400 is mounted on the flying craft 200. As illustrated in FIG. 3B, the stationary flying craft 300 is equipped with the plurality of rotors 310 that rotate thereby generating lift and propulsion. The measurement instruction apparatus 500 is mounted on the stationary flying craft 300.

The flying craft 200 is an unmanned flying craft capable of moving through the air and hovering in the air and examples of the flying craft 200 include a drone, multicopter, and an Unmanned Aerial Vehicle (UAV). As illustrated in FIG. 3A, the flying craft 200 is equipped with the plurality of rotors 210 that rotate thereby generating lift and propulsion. The measurement apparatus 400 is mounted on the flying craft 200. When the architectural structure 100 is to be measured, the flying craft 200 flies in vicinity of the architectural structure 100 by way of at least one of the measurement positions 130 along the flight scenario 531 in accordance with the instruction of the measurement instruction apparatus 500.

The rotor 210 is rotated by a non-illustrated motor thereby generating lift and propulsion which in turn causes the flying craft 200 to fly.

The stationary flying craft 300 is an unmanned flying craft capable of moving through air and hovering in the air and examples of the flying craft 300 include a drone, multicopter, and an Unmanned Aerial Vehicle (UAV). As illustrated in FIG. 3B, the stationary flying craft 300 is equipped with the plurality of rotors 310 that rotate thereby lift and propulsion. The measurement instruction apparatus 500 is mounted on the flying craft 300. When the architectural structure 100 is to be measured, the flying craft 300 hovers in the air in vicinity of the architectural structure 100 at a position where both the architectural structure 100 and the flying craft 200 are observable.

The rotor 310 of the stationary flying craft 300 is the same as the rotor 210 of the flying craft 200.

Figure 4A:
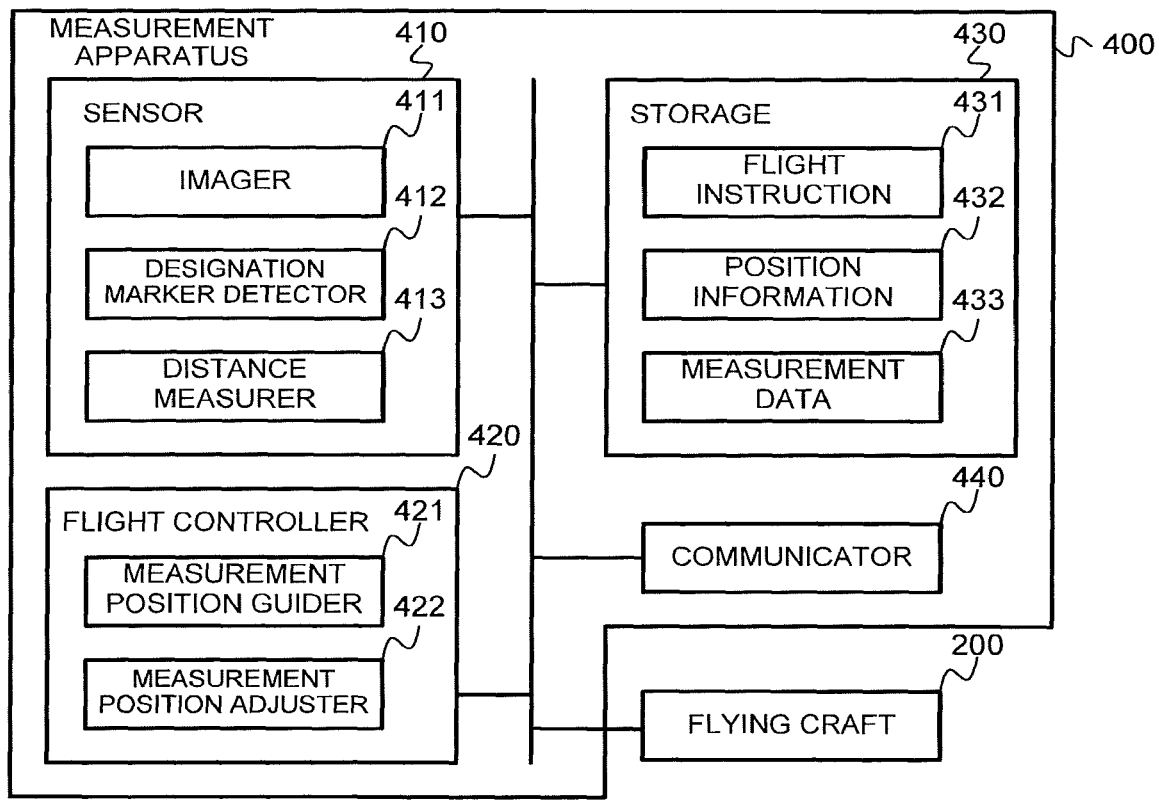
FIG. 4A is a block diagram illustrating a configuration of the measurement apparatus.

FIG. 4A is a block diagram illustrating a configuration of the measurement apparatus 400. As illustrated in FIG. 4A, the measurement apparatus 400 includes a sensor 410 that detects the marker 120 and measures the architectural structure 100, a flight controller 420 that controls flight of the flying craft 200, a storage 430 that stores data and a program that are used by the measurement apparatus 400, and a communicator 440 that communicates with the measurement instruction apparatus 500 and the remote control apparatus 600. Examples of the measurement apparatus 400 include a processing apparatus, random-access memory (RAM), and read-only memory (ROM), but the measurement apparatus 400 is not limited to these examples.

The sensor 410 takes an image of the architectural structure 100, detects the marker 120, and measures the shape of the architectural structure 100. The sensor 410 includes a imager 411 that takes an image of the architectural structure 100, a designation marker detector 412 that detects a designation marker 121 based on the image taken by the imager 411, and a distance measurer 413 that measures a distance with respect to the architectural structure 100.

The imager 411 takes an image of the architectural structure 100. Examples of the imager 411 include a camera and an image sensor but the imager 411 is not limited to these examples. The designation marker detector 412 analyzes the image taken by the imager 411 and detects the designation marker 121. The distance measurer 413 measures the distance from the flying craft 200 to a point on the surface of the architectural structure 100 that is closest to the flying craft 200.

The flight controller 420 controls flight of the flying craft 200. The flight controller 420 includes a measurement position guider 421 that causes the flying craft 200 to move in accordance with an instruction of the measurement instruction apparatus 500 and a designation position adjuster 422 that controls the flying craft 200 to move the flying craft 200 to the measurement position 130.

The measurement position guider 421 controls and moves the flying craft 200 in accordance with an instruction received via the communicator 440 from the measurement instruction apparatus 500. Also, the measurement position guider 421 controls the flying craft 200, based on a distance measured by the distance measurer 413, such that the flying craft 200 flies while keeping distance at a predetermined value from the surface of the architectural structure 100. When controlled in this manner, the flying craft 200 flies on a plane at a predetermined distance from the architectural structure 100. The plane on which the flying craft 200 flies is hereinafter referred to as a flight plane. The designation position adjuster 422 controls the flying craft 200 based on a relative position between the measurement position 130 and the designation marker 121 detected by the designation marker detector 412 to make the position of the flying craft 200 match with the measurement position 130.

The storage 430 stores data that is used by the sensor 410 and the flight controller 420 and data that is output by the sensor 410 and the flight controller 420. The storage 430 stores a flight instruction 431 specifying a flight direction and flight distance along the flight plane 140, stores position information 432 specifying the position and the identification code of the designation marker 121, and stores measurement data 433 that is data measured by the sensor 410.

The flight instruction 431 stores a flight direction and flight distance of the flying craft 200 flying on the flight plane 140. The flight direction and the flight distance are created by the measurement instruction apparatus 500. The measurement position guider 421 causes the flying craft 200 to move in accordance with the flight instruction 431. The position information 432 specifies a position and identification code of the marker 120 including the designation marker 121. The designation marker detector 412 acquires an identification code of the designation marker 121 based on the position information 432. The measurement data 433 is measurement data regarding the shape of the architectural structure 100 measured by the sensor 410, such as an image of the architectural structure 100 taken by the imager 411.

The communicator 440 communicates with the measurement instruction apparatus 500 and the remote control apparatus 600 and exchanges data and commands.

Figure 4B:
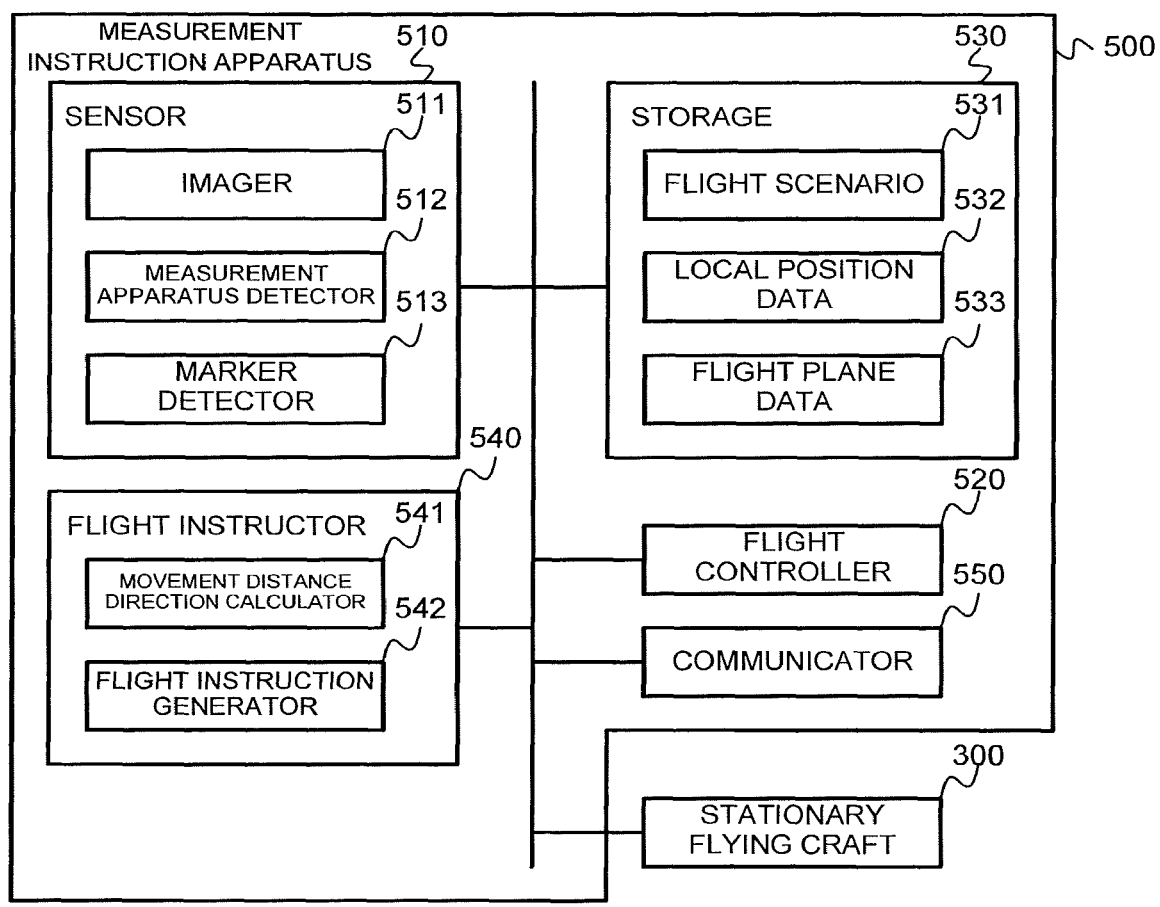
FIG. 4B is a block diagram illustrating a configuration of a measurement instruction apparatus.

FIG. 4B is a block diagram illustrating a configuration of the measurement instruction apparatus 500. As illustrated in FIG. 4B, measurement instruction apparatus 500 includes a sensor 510 that measures the position of both the architectural structure 100 and the flying craft 200, a flight controller 520 that controls the flight of the stationary flying craft 300, a storage 530 that stores data and a program used by the measurement instruction apparatus 500, a flight instructor 540 that generates a flight instruction, based on the measurement result of the sensor 510 instructing the measurement apparatus 400 of a measurement position 130 as a relative position with respect to the position of the flying craft 200, and a communicator 550 that communicates with the measurement apparatus 400 and the remote control apparatus 600. Examples of the measurement instruction apparatus 500 include a processing apparatus, RAM, and ROM but the measurement instruction apparatus 500 is not limited to these examples.

The sensor 510 takes an image of the architectural structure 100 and the flying craft 200 and measures the relative position of the flying craft 200 with respect to the architectural structure 100. The sensor 510 includes an imager 511 that takes an image of the architectural structure 100 and the flying craft 200, a measurement apparatus detector 512 that detects the position of the flying craft 200 based on the image taken by the imager 511, and a marker detector 513 that detects the marker 120 based on the image taken by the imager 511.

The imager 511 takes an image of the architectural structure 100 and the flying craft 200. Examples of the imager 511 include a camera and an image sensor but the imager 511 is not limited to these examples. A measurement apparatus detector 512 analyzes the image taken by the imager 511 and measures the position of the flying craft 200. The marker detector 513 analyzes the image taken by the imager 511 and detects the marker 120.

The flight controller 520 controls the stationary flying craft 300 to hover while maintaining a position and altitude.

The storage 530 stores data that is used by the sensor 510 and the flight controller 520 and stores data that is output by the sensor 510 and the flight controller 520. The storage 530 stores the flight scenario 531 specifying a route to be flown by the flying craft 200, local position data 532 being data of the stationary position 54 of the stationary flying craft 300, and flight plane data 533 being data of the position and shape of the flight plane 140.

The at least one measurement position 130 that the flying craft 200 flies through to measure the architectural structure 100 and designation marker 121 on which the measurement position 130 is based are stored in the flight scenario 531 in order in a sequence in which the flying craft 200 flies. A measurement condition for each measurement position 130 is also stored in the flight scenario 531. The measurement condition includes an image-taking orientation and an image quantity. The local position data 532 is data indicating a position of stationary flying craft 300 in which the measurement instruction apparatus 500 is mounted. The position of the stationary flying craft 300 is defined as a position where the stationary flying craft 300 is both directly above the reference point 27 and facing the architectural structure 100 head-on. The flight controller 520 controls the stationary flying craft 300 based on the local position data 532 to make the stationary flying craft 300 hover at stationary position 54. The flight controller 520 control the stationary flying craft 300 while confirming that the stationary flying craft 300 is directly above the reference point 27 to keep the height of the stationary flying craft 300 at a height where the stationary flying craft 300 is facing a measurement plane of the architectural structure 100 head-on. Specifically, the flight controller 520 uses image processing to confirm skewing of the marker 120 of the architectural structure 100 in the image taken and sets the location where the image showing the least skewing is taken as the head-on position. The flight plane data 533 is data of the position and the shape of the flight plane 140 on which the flying craft 200 flies.

The flight instructor 540 generates a flight instruction directed to flying craft 200. The flight instructor 540 includes a movement distance direction calculator 541 that calculates a movement direction and distance and a flight instruction generator 542 that generates a flight and measurement instruction directed at the flying craft 200.

The movement distance direction calculator 541 calculates a relative position on the flight plane 140 from the position of the flying craft 200 of the measurement position 130 based on the position of the flying craft 200 and the position of the designation marker 121 that are detected by the sensor 510 and the flight scenario 531. The movement distance direction calculator 541 calculates a relative position as a movement direction and movement distance for the flying craft 200 to reach the measurement position 130 on the flight plane 140. The flight instruction generator 542 generates, based the movement direction and movement distance that are calculated by the movement distance direction calculator 541 and the flight scenario 531, a command indicating a flight and measurement instruction directed at the flying craft 200 and transmits the generated command to the flying craft 200 via the communicator 550.

Figure 5:
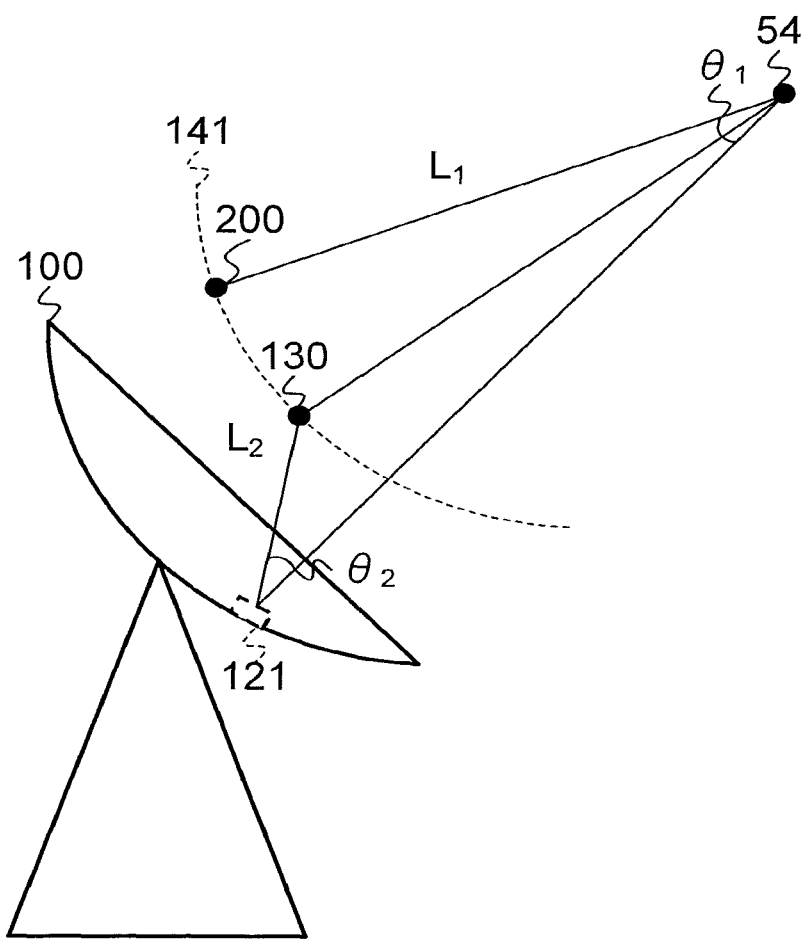
FIG. 5 is a side view of the architectural structure and a curved flight plane.

A method that the movement distance direction calculator 541 uses to calculate the movement direction and the movement distance is described with reference to the drawings. FIG. 5 is a side view of the architectural structure 100 and a curved flight plane 141. In FIG. 5, the flying craft 200 is depicted as a dot to clearly indicate the position of the flying craft 200. The flight plane 141 is a spherical plane centered on the stationary position 54 of the stationary flying craft 300. As illustrated in FIG. 5, the flying craft 200 moves on the flight plane 141 and performs a measurement at the measurement position 130.

The measurement instruction apparatus 500 analyzes an image taken by the imager 511 and acquires a viewing angle $\theta_1$ between the flying craft 200 and the designation marker 121. $\theta_2$ is the angle between the direction from the designation marker 121 to the measurement position 130 and the direction from the designation marker 121 to the measurement instruction apparatus 500. $\theta_2$ may be measured based on the skewing of the designation marker 121 in the image taken by the imager 511. The frontal direction of each of the designation markers 121 may be stored in the storage 530 and $\theta_2$ may be obtained by performing a calculation based on the position of the measurement instruction apparatus 500. Distance $L_1$ between the stationary flying craft 300 and the flying craft 200 is already known from the flight position of the stationary flying craft 300. The distance $L_2$ between the designation marker 121 and the flight path 141 is already known from the relative position between the measurement position 130 and the designation marker 121.

In order for the flying craft 200 to arrive at the measurement position 130, it is sufficient for the flying craft 200 to move at a distance L, as denoted in formula (1) indicated below, on the flight plane 141 downwardly in FIG. 5.

$$L = L_1 \times \theta_1 - L_2 \times \theta_2 \tag{1}$$

Figure 6:
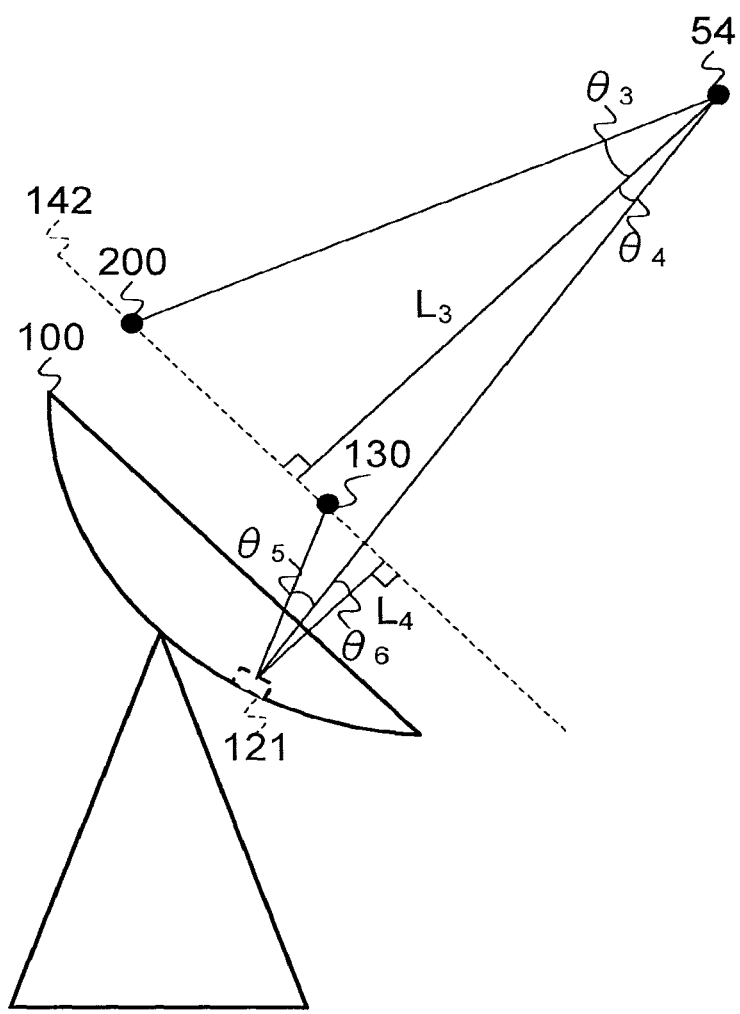
FIG. 6 is a side view of the architectural structure and a planar flight plane.

FIG. 6 is a side view of the architectural structure 100 and a planar flight plane 142. As illustrated in FIG. 6, the flying craft 200 moves on the flight plane 142 and performs a measurement at the measurement position 130.

The measurement instruction apparatus 500 acquires, based on the result from analyzing the image taken by the imager 511 and the flight plane data 533, a viewing angle $\theta_3$ between (i) a line extending perpendicularly from the stationary flying craft 300 to the flight plane 142 and (ii) the direction from the stationary flying craft 300 to the flight plane 142, and a viewing angle $\theta_4$ between (i) the line extending perpendicularly from the stationary flying craft 300 to the flight plane 142, and (iii)) the designation marker 121.

Specifically, the measurement instruction apparatus 500 obtains a viewing angle ($\theta_3+\theta_4$) between the flying craft 200 from the stationary flying craft 300 and the designation marker from the stationary flying craft 300) based on the result from analyzing the image taken by the imager 511. Next, direction of the line extending from the stationary flying craft 300 to the flight path 142 is calculated based on the position of the flight plane 142 stored in the flight plan data 533 and the station-try position 54 of the stationary flying craft 300, thereby obtaining the $\theta_3$ and $\theta_4$. Also, $\theta_5$ is the angle between the direction from the designation marker 21 to the measurement apparatus 130 and the direction from the designation marker 21 to the measurement instruction apparatus 500. The $\theta_5$ may be measured based on the skewing of the designation marker 121 in the image taken by the imager 511. Alternatively, the front direction of each designation marker 121 may be stored in the storage 530 and the $\theta_5$ may be calculated based on the position of the measurement instruction apparatus 500. $\theta_6$ is the same value as the $\theta_4$.

Distance $L_3$ is the distance between the stationary flying craft 300 and the flight plane 142. This value is already known from the flight position of the stationary flying craft 300. Distance $L_4$ is the distance between the designation marker 121 and the flight plane 142. Based on the relative position between the measurement position 130 and the designation marker 121, the distance $L_4$ is already known.

In order for the flying craft 200 to arrive at measurement position 130, it is sufficient for the flying craft 200 to move at a distance L, as denoted in formula (2) indicated below, on the flight plane 142 downwardly in FIG. 6.

$$L = L_3 \times (\tan \theta_3 + \tan \theta_4) - L_4 \times (\tan(\theta_5 + \theta_6) - \tan \theta_5) \tag{2}$$

The measurement instruction apparatus 500 performs the same measurement for two directions that intersect with each other, synthesizes the results obtained using formula (1) and formula (2) for each of the directions, and sets a two-dimensional vector representing the direction and distance on the flight plane 140 with respect to the position of the flying craft 200 at the measurement position 130. The measurement instruction apparatus 500 uses the two-dimensional vector obtained by the above-described method to instruct to the flying craft 200 a relative position of the measurement position 130 with respect to the position of the flying craft 200, the relative position being the direction and distance that the flying craft 200 moves on the flight plane 140 towards the measurement position 130.

By breaking the flight plane 140 into a combination of a curved plane and planar plane and calculating the movement distance by using the combination of formula (1) and formula (2), the movement direction and movement distance can be calculated even in a case in which the flight plane 140 has a complicated shape.

The communicator 550 communicates with the measurement apparatus 400 and the remote control apparatus 600 and exchanges data and commands.

The remote control apparatus 600 is a terminal apparatus that receives data and instruction input by the user and creates, based on the inputs, commands directed to the stationary flying craft 300, the flying craft 200, the measurement apparatus 400, and the measurement instruction apparatus 500. Examples of the remote control apparatus 600 include a personal computer, a workstation, and a smartphone but the remote control apparatus 600 is not limited to these examples.

The remote control apparatus 600 creates, based on an input by a user, the flight scenario 531 and position information 432. The created flight scenario 531 from the remote control apparatus 600 is received by the measurement apparatus 500 via the communicator 550 and is stored into the storage 530. The position information 432 is created by the remote control apparatus 600. The created position information 432 from the remote control apparatus 600 is received by the measurement apparatus 400 via the communicator 440 and is stored into the storage 430.

The remote control apparatus 600 receives, via the communicator 440, data of the shape of the architectural structure 100 measured by the measurement apparatus 400.

In a case in which the designation marker 121 cannot be identified due to an occurrence a significant positional deviation of the flying craft 200 caused by an external disturbance such as wind, the flying craft 200 receives, from the measurement instruction apparatus 500, an instruction indicating the shortest route to return to the flight route, and returns to the flight route. In a case in which it is difficult to return to the flight route, the flying craft 200 receives, from the measurement instruction apparatus 500, an instruction to land at a predetermined safety landing location or an instruction to land at a location directly below the flight position, and then lands.

In a case in which the measurement apparatus 400 loses a signal from the measurement instruction apparatus 500, the flying craft 200 stays in the same location in order to confirm whether the signal from the measurement instruction apparatus 500 is recovered. If the signal cannot be recovered, the flying craft 200 either lands at the predetermined safety landing location or the location directly below the flight position.

In a case in which the stationary flying craft 300 or the flying craft 200 lose flight capability, the stationary flying craft 300 or the flying craft 200 will glide or deploys a safety apparatus such as a parachute and land at the predetermined safety landing location or the location directly below the flight position.

Figure 7:
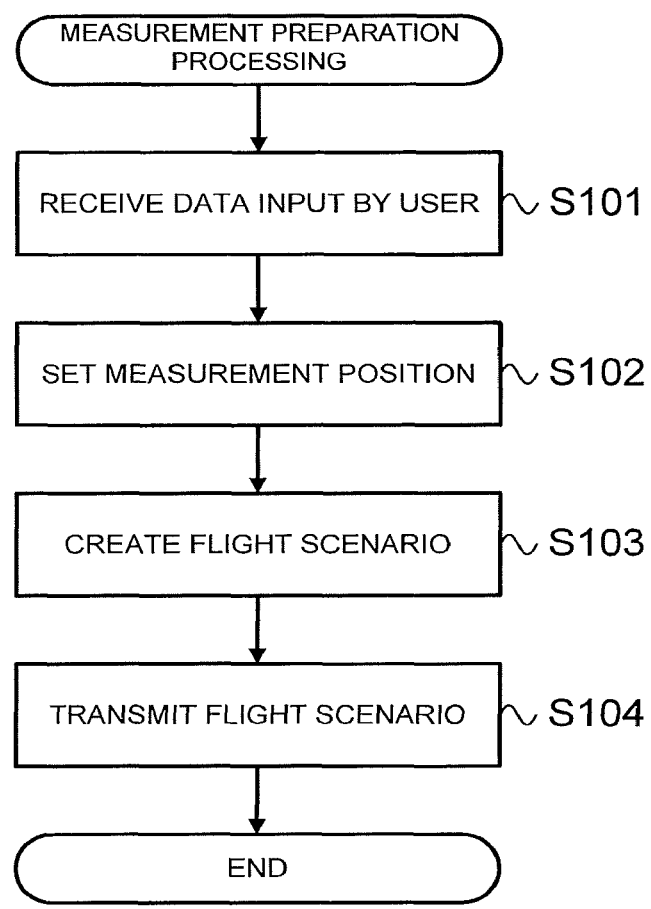
FIG. 7 is a flowchart of measurement preparation processing.

Operations performed by the measurement system 1 for performing measurement of the architectural structure 100 are described with reference to FIGS. 7 to 9. FIG. 7 is a flowchart of measurement preparation processing that is executed by the remote control apparatus 600. The measurement preparation processing is described with reference to the flowchart of FIG. 7.

Upon starting measurement preparation processing, the remote control apparatus 600 receives a position of the marker 120 on the architectural structure 100 and the data of the flight plane 140 that are input by the user (step S101).

Upon receiving the data input by the user, the remote control apparatus 600 sets a plurality of measurement positions 130 that are necessary for measuring the entirety of the architectural structure 100 and sets designation markers 121 corresponding to the measurement positions 130 (step S102).

Upon setting the measurement positions 130 and the designation markers 121, the remote control apparatus 600 creates the flight scenario 531 indicating a route with the set plurality of measurement positions 130 to be passed through (step S103).

Upon creating the flight scenario 531, the remote control apparatus 600 transmits the created flight scenario 531 to measurement instruction apparatus 500 (step S104), and measurement preparation processing ends.

Figure 8:
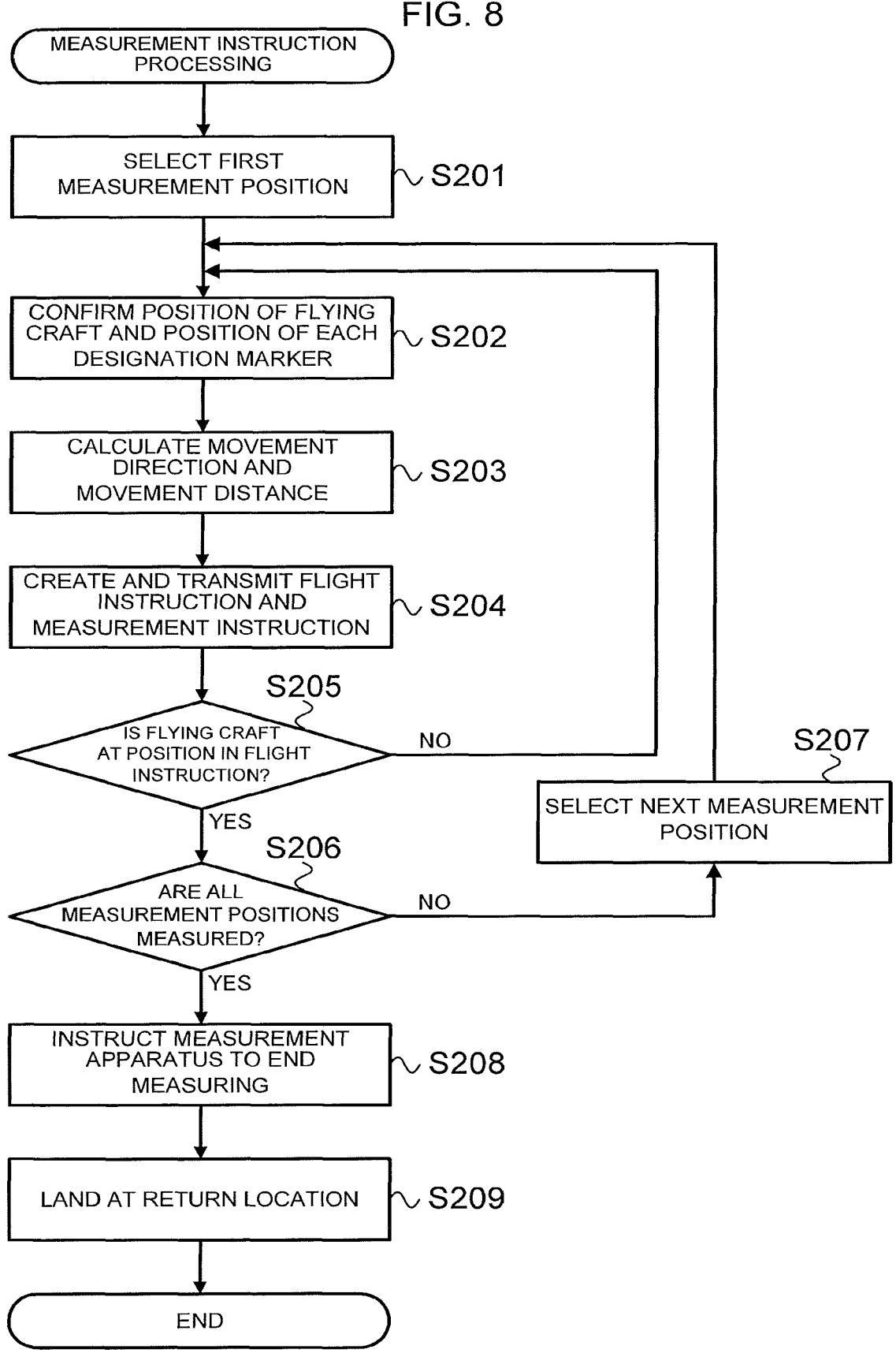
FIG. 8 is a flowchart of measurement instruction processing.

FIG. 8 is a flowchart of measurement instruction processing that is executed by the measurement instruction apparatus 500. Upon completion by the remote control apparatus 600 of the measurement preparation processing, the measurement instruction apparatus 500 performs measurement instruction processing and issues an instruction regarding measurement of the architectural structure 100 to the measurement apparatus 400. The measurement instruction processing is described with reference to the flowchart of FIG. 8.

Upon starting of the measurement processing, the measurement instruction apparatus 500 selects a first measurement position 130 based on the flight scenario 531 (step S201). The measurement apparatus detector 512 analyzes an image taken by the imager 511 and measures the position of the flying craft 200. The marker detector 513 analyzes the image taken by the imager 511 and detects the designation marker 121 corresponding to the measurement position 130 selected by the flight instruction 540 (step S202).

Upon detecting the position of the flying craft 200 and the position of the designation marker 121, the movement distance direction calculator 541 calculates a relative position of the measurement position 130 with respect to the position of the flying craft 200 based on the detected position of the flying craft 200, the data of the detected designation marker 121, and the flight scenario 531 received from the remote control apparatus 600 (step S203). The relative position of the measurement position 130 is calculated as a movement direction and a movement distance to the measurement position 130 of the flying craft 200 on the flight plane 140.

Upon the movement distance direction calculator 541 calculating the movement direction and the movement distance, the flight instruction generator 542 generates a flight instruction, directed at the measurement apparatus 400, instructing flight to the measurement position 130, and generates a measurement instruction, directed at the measurement apparatus 400, instructing measurement at the measurement position 130. The measurement instruction apparatus 500 transmits the measurement instruction to the measurement apparatus 400 via the communicator 550 (step S204).

Upon the measurement instruction apparatus 500 transmitting the flight instruction and the measurement instruction, processing proceeds to step S205. Upon receiving the flight instruction and the measurement instruction, the measurement apparatus 400 controls the flying craft 200 based on the flight instruction and the flying craft 200 flies to the measurement position 130.

The measurement instruction apparatus 500 determines, based on the data of the designation marker detected by the sensor 510, whether or not the flying craft 200 is flying to the position indicated by the flight instruction (step S205). In a case in which a determination is made that the flying craft 200 is not flying to the position indicated by the flight instruction (NO in step S205), the measurement instruction apparatus 500 returns processing to step S202.

In a case in which a determination is made that the flying craft 200 is flying to the measurement position 130 (YES in step S205), the measurement instruction apparatus 500 receives a notification of measurement execution from the measurement apparatus 400 and advances processing to step S206.

Upon receiving notification of measurement completion from the measurement apparatus 400, the measurement instruction apparatus 500 determines whether or not the measurement apparatus 400 performed measurement of the architectural structure 100 at all of the measurement positions 130 in the flight scenario 531 (step S206). In a case in which a determination is made that measurement at all of the measurement positions 130 in the flight scenario 531 is not performed (NO in step S206), the measurement instruction apparatus 500 selects the next measurement position in the flight scenario 531 (step S207), and processing proceeds to step S202.

In a case in which a determination is made measurement of the architectural structure 100 is performed at all of the measurement positions 130 (YES in step S206), the measurement instruction apparatus 500 instructs the measurement apparatus 400 to end measurement (step S208). Upon being instructed to end measurement, the measurement instruction apparatus 500 controls the stationary flying craft 300 to land at a return location (step S209), and measurement instruction processing ends.

Figure 9:
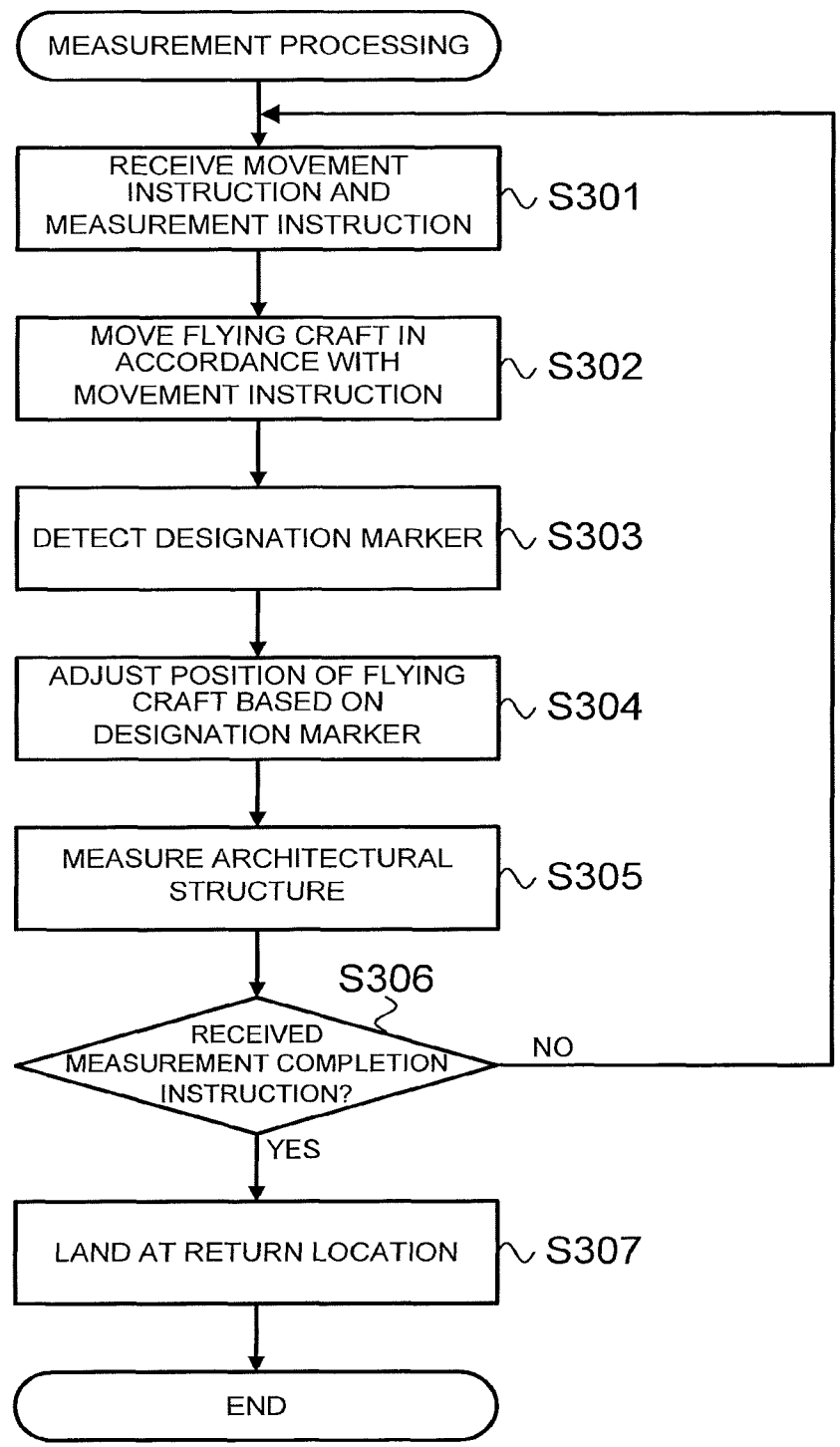
FIG. 9 is a flowchart of measurement processing.

FIG. 9 is a flowchart of measurement processing that is executed by the measurement apparatus 400. The measurement processing is described with reference to the flowchart in FIG. 9.

Upon starting the measurement processing, the measurement apparatus 400 receives, via the communicator 440, the flight instruction and the measurement instruction transmitted by the measurement instruction apparatus 500 (step S301). Upon receiving the flight instruction, the measurement position guider 421 of the measurement apparatus 400 causes the flying craft 200 to move to the position indicated by the flight instruction containing the movement direction and the movement distance to the measurement position 130 (step S302).

After the measurement position guider 421 causes the flying craft 200 to move, the designation marker detector 412 detects the designation marker 121 corresponding to the measurement position 130 (step S303). The designation position adjuster 422 uses the position of the designation marker 121 detected by the designation marker detector 412 as the reference point to control the flying craft 200 to make the position of the flying craft 200 match with the measurement position 130 (step S304). Once the position of the flying craft 200 matches with the measurement position 130, the measurement apparatus 400 uses the imager 411 perform measurement of the architectural structure 100 (step S305).

Upon executing measurement of the architectural structure 100 with the imager 411, the measurement apparatus 400 notifies the measurement instruction apparatus 500 that measurement is executed and then determines whether or not the measurement completion instruction transmitted from the measurement instruction apparatus 500 as a response is received (step S306).

In a case in which a determination is made that measurement completion instruction is not received (NO in step S306), processing returns to step S301. In a case in which a determination is made that the measurement completion instruction is received (YES in step S306), the measurement apparatus 400 controls the flying craft 200 to land at the return location and ends measurement (step S307).

By including a configuration as described above and executing measurement processing, the measurement system 1 according to the first embodiment is capable of measuring the architectural structure 100 even in a case in which position information from a satellite positioning system cannot be obtained, as the position of the architectural structure 100 and the position of the measurement apparatus 400 are observable by the measurement instruction apparatus 500.

Since the flying craft 200 moves and performs measurement along the flight plane 140, the measurement instruction apparatus 500 can instruct the flying craft 200 with a movement direction and a movement distance to the measurement position 130 by using only two-dimensional image information obtained from an image of the architectural structure 100 and the flying craft 200.

The embodiment of the present disclosure is not limited to the examples provided above. Modifications can be used. Although an example is given in which the flight scenario 531 is created by the remote control apparatus 600 and transmitted to the measurement instruction apparatus 500, the flight scenario 531 is not limited to this example. The measurement instruction apparatus 500 may store the entire flight scenario 531 before measurement begins.

The sensor 410 of the measurement apparatus 400 may also include a collision prevention sensor. Examples of a collision prevention sensor 317 include an ultrasonic sensor, a millimeter-wave sensor, and an image sensor but the collision prevention sensor 317 is not limited to these examples. The collision prevention sensor detects obstacles such as the architectural structure 100 and the stationary flying craft 300. Upon detecting the obstacle, the flight controller 420 controls the flying craft 200 to avoid contacts with the obstacle.

Although an example is given in which the imager 411 of the measurement apparatus 400 is a camera or an image sensor that measures a shape by taking an image of the architectural structure 100, the imager 411 is not limited to these examples. The imager 411 may be a laser distance measurer that measures the shape of the architectural structure 100 based on a distance measurement.

Although an example is given in which the measurement apparatus 400 includes the designation marker detector 412 and the designation position adjuster 422 and confirms the designation marker 121 and adjusts the position by itself after moving in accordance with the instruction from the measurement instruction apparatus 500, the measurement apparatus 400 is not limited to this example. The measurement apparatus 400 may be guided to the measurement position 130 by the measurement instruction apparatus 500 alone, without the measurement apparatus 400 having means to confirm the designation marker 121. In such a case, each time the flying craft 200 moves, the measurement instruction apparatus 500 confirms the position of the flying craft 200 and the position of the designation marker 121, detects any positional deviation of the flying craft 200, and provides a movement instruction to the flying craft 200.

Also, although an example is given in which the measurement position 130 for measuring the architectural structure 100 is determined based on the designation marker 121 provided on the architectural structure 100, this example is not limiting. The measurement position 130 may be determined based a characteristic shape of the architectural structure 100 itself, without providing the architectural structure 100 with the designation marker 121.

Figure 10:
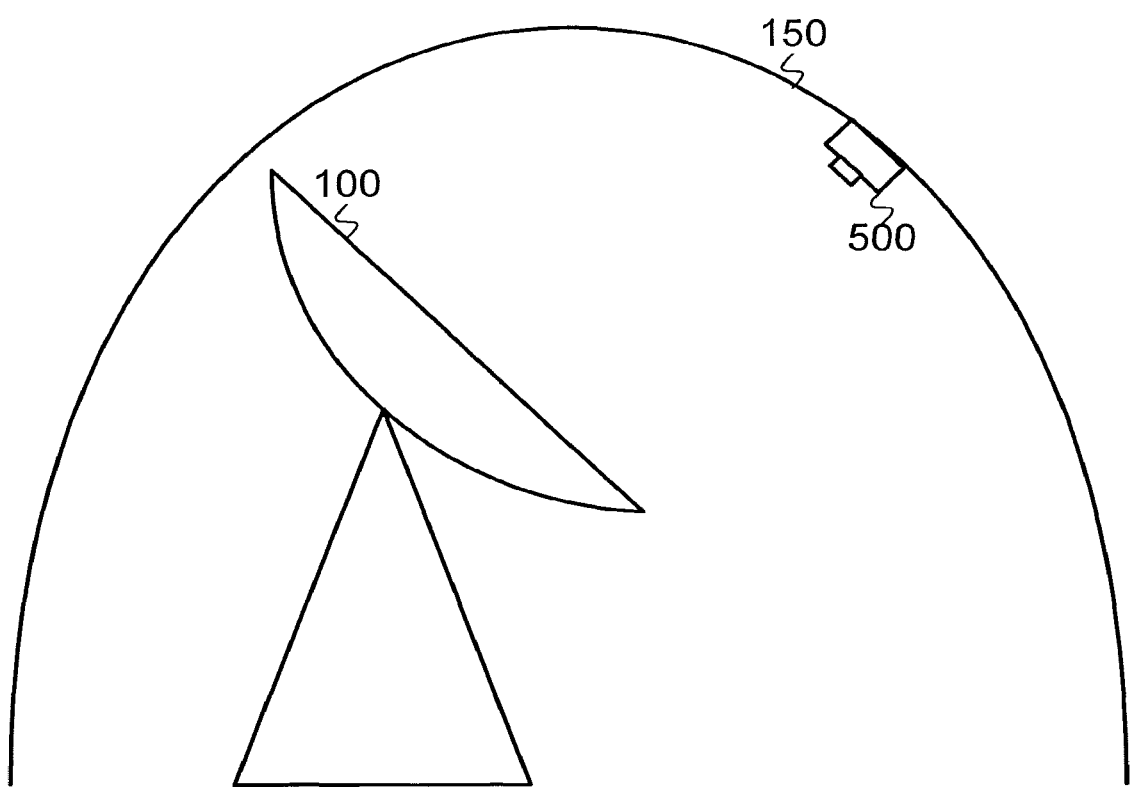
FIG. 10 is a side view of the architectural structure, a radome, and a measurement instruction apparatus that is fixed to the radome.

Although an example is given in which the measurement instruction apparatus 500 is mounted on the stationary flying craft 300 and is stationary in the air, the measurement instruction apparatus 500 is not limited to this example. A temporary support structure may be provided in vicinity of the architectural structure 100 and the measurement instruction apparatus 500 may be fixed to the temporary support structure. FIG. 10 is a side view of the architectural structure 100, a radome 150, and the measurement instruction apparatus 500 that is fixed to the radome 150. As illustrated in FIG. 10, in a case in which the architectural structure 100 is an antenna and is enclosed in the radome 150, the measurement instruction apparatus 500 may be fixed to the radome 150.

Figure 11:
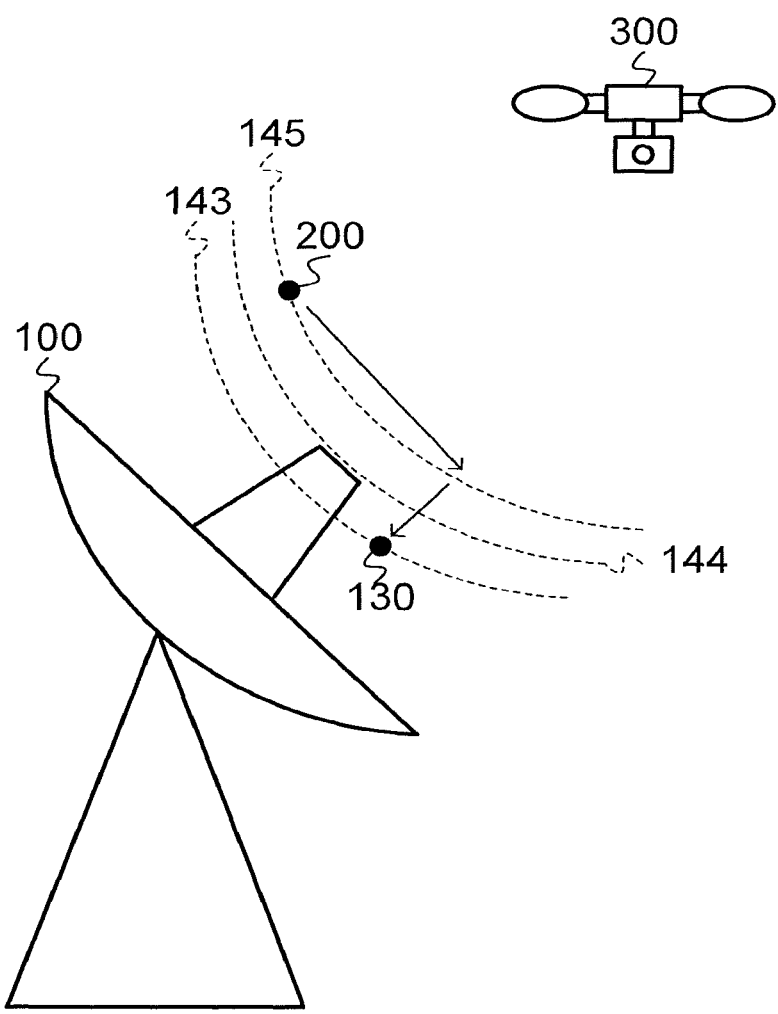
FIG. 11 is a side view of the architectural structure and a plurality of flight planes.

The flight plane 140 on which the flying craft 200 flies is not limited to one flight plane, and may be a plurality of flight planes. FIG. 11 is a side view of the architectural structure 100 and a plurality of flight planes 143 to 145. As illustrated in FIG. 11, there may be a plurality of flight planes 143 to 145 and the flight craft 200 may move along these flight planes. In the example of FIG. 11, there is a convex portion on the surface of the architectural structure 100 and in a case in which, due to the convex portion, the flying craft 200 cannot move on the flight on the flight planes 143 and 144 that are close to the architectural structure, the flying craft 200 moves on the flight plane 145 that is far from the architectural structure 100. Also, in a case in which measurements are required from various distances from the architectural structure 100, the flying craft 200 may move between the flight planes 143 to 145 to perform measurements.

As for the stationary position 54 at which the stationary flying craft 300 hovers, although an example is given in which the height direction is defined by the architectural structure 100 and the lateral direction is defined by the reference point 27 these are not limiting. The stationary position 54 is not limited to these examples. The stationary position 54 at which the stationary flying craft 300 hovers may be defined by the distance and the direction from the architectural structure 100. Alternatively, the stationary position 54 at which the stationary flying craft 300 hovers may be defined by the distance and the direction from the reference point 27. In such a case, the measurement instruction apparatus 500 takes an image of the architectural structure 100 or the reference point 27 and controls the flying craft 300 based on the position of the architectural structure 100 or the position of the reference point 27.

The means and method for performing each type of processing in the system 1 according to the embodiment can be realized by a dedicated hardware circuit or a programmed computer. The program may be provided on a non-transitory computer-readable recording medium such as a flexible disc and a compact disc (CD)-ROM or may be provided on-line via a network such as the Internet. In such a case, the program stored on the non-transitory computer-readable recording medium normally is transferred and stored into a storage such as a hard disk. Also, the program maybe provided as a standalone application or may be incorporated into the software of the apparatus as a function of the apparatus.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure may be used with advantage for measuring an architectural structure.

What is claimed is:

1. A measurement system comprising:
a measurement apparatus to be mounted on a flying craft that flies in vicinity of an architectural structure, the measurement apparatus comprising processing circuitry configured to control the flying craft to move to a measurement position indicated as a relative position with respect to a position of the flying craft and measure the architectural structure; and
a measurement instruction apparatus comprising processing circuitry configured to perform an observation of a position of the architectural structure and a position of the flying craft and, based on a result of the observation, to provide to the measurement apparatus an instruction indicating the measurement position,
wherein the measurement instruction apparatus is mounted on a stationary flying craft that is stationary at a position where the architectural structure and the flying craft are observable.

2. The measurement system according to claim 1, wherein the architectural structure includes a marker that is detectable by the measurement apparatus, and
the measurement apparatus detects the marker and controls the flying craft based on a position of the marker thereby causing the flying craft to move to the measurement position.

3. A measurement system comprising:
a measurement apparatus to be mounted on a flying craft that flies in vicinity of an architectural structure, the measurement apparatus comprising:
processing circuitry configured to control the flying craft to move to a measurement position indicated as a relative position with respect to a position of the flying craft and measuring the architectural structure; and
a measurement instruction apparatus comprising processing circuitry configured to perform an observation of a position of the architectural structure and a position of the flying craft and, based on a result of the observation, to provide to the measurement apparatus an instruction indicating the measurement position,
wherein the measurement apparatus controls the flying craft to fly on a flight plane at a predetermined distance with respect to the architectural structure, and
the measurement instruction apparatus provides an instruction to the measurement apparatus indicating the measurement position as the relative position on the flight plane with respect to the flying craft.

4. The measurement system according to claim 2, wherein the architectural structure includes a marker that is detectable by the measurement apparatus, and
the measurement apparatus detects the marker and controls the flying craft based on a position of the marker thereby causing the flying craft to move to the measurement position.

5. A non-transitory computer-readable recording medium storing a program for causing a computer of a measurement instruction apparatus to execute processing comprising:
performing an observation of a position of an architectural structure and a position of a flying craft;
providing, based on a result of the observation, an instruction indicating a measurement position where the architectural structure is to be measured as a relative position with respect to the position of the flying craft; and
measuring the architectural structure at the measurement position,
wherein the measurement instruction apparatus is mounted on a stationary flying craft that is stationary at a position where the architectural structure and the flying craft are observable.

\* \* \* \* \*